US012755670B2

(12) United States Patent
Chen

(10) Patent No.: US 12,755,670 B2
(45) Date of Patent: Oct. 6, 2026

(54) DISPLAY DEVICE AND OPERATING METHOD OF DISPLAY DEVICE

(71) Applicant: Wistron Corporation, New Taipei City (TW)

(72) Inventor: Feng Yuan Chen, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 0 days.

(21) Appl. No.: 19/072,890

(22) Filed: Mar. 6, 2025

(65) Prior Publication Data

US 2026/0170995 A1 Jun. 18, 2026

(30) Foreign Application Priority Data

Dec. 13, 2024 (TW) ................................ 113148767

(51) Int. Cl.
*G09G 3/20* (2006.01)
*G06F 13/42* (2006.01)

(52) U.S. Cl.
CPC ....... *G09G 3/2096* (2013.01); *G06F 13/4282* (2013.01); *G09G 2320/103* (2013.01); *G09G 2370/22* (2013.01)

(58) Field of Classification Search
None
See application file for complete search history.

(56) References Cited

U.S. PATENT DOCUMENTS

| | | | | |
|---|---|---|---|---|
| 12,096,031 | B2 | 9/2024 | Fitzgerald et al. | |
| 2010/0115153 | A1 | 5/2010 | Lo et al. | |
| 2020/0145696 | A1 | 5/2020 | Fitzgerald et al. | |
| 2020/0302894 | A1 * | 9/2020 | Khen ....................... | G09G 5/14 |

FOREIGN PATENT DOCUMENTS

| | | |
|---|---|---|
| TW | 201019339 | 5/2010 |
| TW | 201904294 | 1/2019 |

* cited by examiner

*Primary Examiner* — Nicholas J Lee
(74) *Attorney, Agent, or Firm* — JCIPRNET

(57) ABSTRACT

Provided are a display device and an operating method for the display device. The display device includes a display panel, a channel selection circuit, and a processor. The channel selection circuit transmits communication data through one of channels. The processor receives image data and controls the display panel to display an image according to the image data. The processor determines an image source of the image according to a link command. The processor switches one of the channels to be an active channel according to the image source.

20 Claims, 12 Drawing Sheets

DISPLAY DEVICE AND OPERATING METHOD OF DISPLAY DEVICE

CROSS-REFERENCE TO RELATED APPLICATION

This application claims the priority benefit of Taiwan application serial no. 113148767, filed on Dec. 13, 2024. The entirety of the above-mentioned patent application is hereby incorporated by reference herein and made a part of this specification.

BACKGROUND

Technical Field

The disclosure relates to a device and an operating method of the device, and particularly relates to a display device and an operating method of the display device.

Description of Related Art

A current display device may be connected to a plurality of electronic devices (for example, a host of a desktop computer, a notebook computer). The display device may receive image data and communication data from one of the plurality of electronic devices.

It should be noted that the display device includes a plurality of ports. A user must perform manual setting through settings of the display device to select the port connected to the electronic device among the plurality of ports, and complete link setting between the port and a hub circuit of the display device. However, if the manual setting of the user is incorrect, a link command cannot be completed. It should also be noted that once the connection between the display device and the electronic device is changed, the user must perform the manual setting again.

It may be seen from this that how to make the display device to automatically implement the link command with the electronic device is one of the research focuses of those skilled in the art.

SUMMARY

The disclosure is directed to a display device and an operating method of the display device, which are adapted to automatically complete a link command between the display device and the electronic device.

In an embodiment of the disclosure, the display device includes a display panel, a hub circuit, a channel selection circuit, and a processor. The channel selection circuit is coupled to the hub circuit. The channel selection circuit transmits communication data to the hub circuit through one of a plurality of channels. The processor is coupled to the channel selection circuit and the display panel. The processor receives image data and controls the display panel to display an image. In response to receiving a link command, the processor determines an image source of the image data according to the link command. The processor switches one of the channels to be an active channel according to the image source.

In an embodiment of the disclosure, the operating method is adapted to the display device. The display device includes a processor, a display panel and a channel selection circuit. The operating method includes: receiving image data by the display device, and controlling the display panel to display an image according to the image data; transmitting communication data through one of a plurality of channels by the channel selection circuit; in response to a link command, determining an image source of the image data by the processor according to the link command; and switching one of the channels to serve as an active channel by the processor according to the image source.

Based on the above description, the display device automatically performs link setting with the electronic device according to the received image data and the link command. The user does not need to perform a manual setting through settings of the display device. In this way, usage convenience of the display device is improved.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
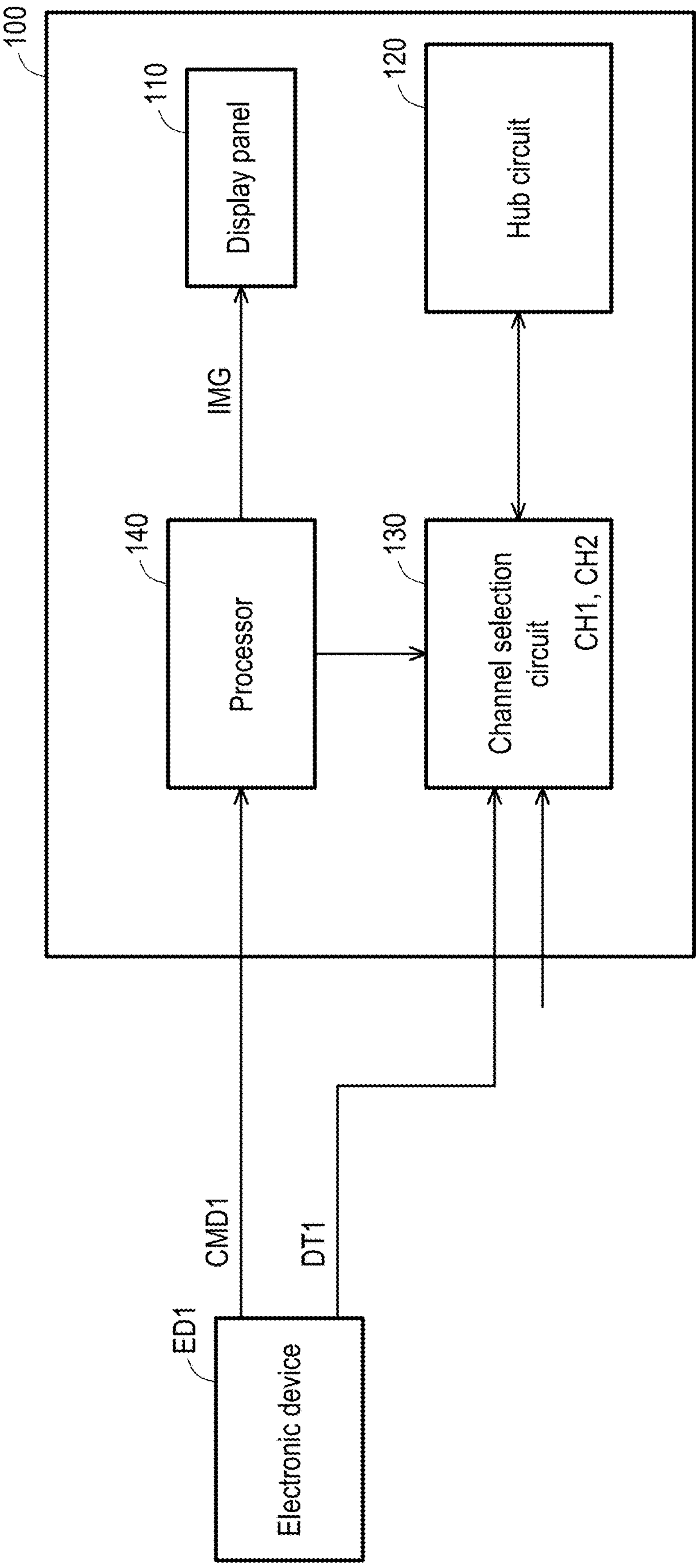
FIG. 1 is a schematic diagram of a display device and an electronic device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts. Theses exemplary embodiments are only a part of the disclosure, and the disclosure does not disclose all of the implementations. More precisely, these exemplary embodiments are only examples within the scope of the patent application of the disclosure.

Referring to FIG. 1, FIG. 1 is a schematic diagram of a display device and an electronic device according to an embodiment of the disclosure. In an embodiment, a display device 100 includes a display panel 110, a hub circuit 120, a channel selection circuit 130, and a processor 140. The channel selection circuit 130 is coupled to the hub circuit 120. The channel selection circuit 130 includes channels CH1 and CH2, and communication data DT1 may be transmitted through one of the channels CH1 and CH2. Under normal circumstances, the channel selection circuit 130 selects one of the channels CH1 and CH2 as an active channel, and the other unselected channel is an inactive channel. Therefore, the channel selection circuit 130 may transmit the communication data DT1 to the hub circuit 120 through the active channel. In the embodiment, the communication data DT1 originates from the electronic device ED1. The electronic device ED1 may be a host of a desktop computer, a notebook computer or a mobile communication device, but the disclosure is not limited thereto.

In an embodiment, the display panel 110 may be a display unit capable of providing a display function, such as a liquid crystal display panel, a light-emitting diode (LED) display panel, an organic light-emitting diode (OLED) display panel, etc., but the disclosure is not limited thereto. The channel selection circuit 130 may be implemented by a multiplexer, but the disclosure is not limited thereto.

In an embodiment, the processor 140 is coupled to the channel selection circuit 130 and the display panel 110. The processor 140 receives image data IMG and controls the display panel 110 to display an image according to the image data IMG. The processor 140 automatically performs link setting according to the received image data IMG and a link command CMD1. In the embodiment, in response to receiving the link command CMD1, the processor 140 determines an image source of the currently displayed image according to the link command CMD1, and switches one of the channels CH1 and CH2 to serve as an active channel according to the image source. The "image source" may be, for example, the electronic device ED1 or other devices. In the embodiment, the processor 140 may control the channel selection circuit 130 according to the image source, so that the channel selection circuit 130 switches one of the channels CH1 and CH2 to serve as the active channel.

For example, taking FIG. 1 as an example, the electronic device ED1 is connected to the channel CH1. However, the channel selection circuit 130 is configured to preset channel CH2 as the active channel. As a result, since the channel CH1 is not set as the active channel, the electronic device ED1 cannot detect the hub circuit 120. In response to this condition, the electronic device ED1 provides the link command CMD1 according to the result that the hub circuit 120 is not detected. In other words, the link command CMD1 is a communication signal that the electronic device ED1 does not detect the hub circuit 120. The processor 140 receives the link command CMD1 and may also receive the image data IMG via the same path. Therefore, the processor 140 may determine whether the image source of the image data IMG originates from the same source (i.e., the electronic device ED1) according to the link command CMD1.

The processor 140 may determine whether the currently displayed image originates from the electronic device ED1 according to the link command CMD1. If the currently displayed image originates from the electronic device ED1 (i.e., the display panel 110 is displaying the image corresponding to the electronic device ED1), and the electronic device ED1 is connected to the channel CH1, but the channel CH1 is not activated. In other words, the current channel CH1 is an inactive channel, which is a channel that prevents the electronic device ED1 from recognizing the hub circuit 120. Consequently, the processor 140 controls the channel selection circuit 130 to set the inactive channel CH1 as an active channel. The processor 140 then associates the active channel with the current image source, thereby performing the link setting.

For example, if the image source of the currently displayed image is different from the source of the link command CMD1, in other words, it is determined that the image source of the currently displayed image is not from the electronic device ED1, but from another device (not shown), the processor 140 controls the channel selection circuit 130 to associate the inactive channel CH1 with the image source that receives the link command CMD1, and controls the display panel 110 to display another image according to the image data from the electronic device ED1. In other words, the display panel 110 displays an image corresponding to the image data of the electronic device ED1.

It should be noted that the display device 100 automatically performs the link setting according to the currently displayed image and the link command CMD1. Therefore, the user does not need to perform a manual setting through settings of the display device 100. In this way, the usage convenience of the display device 100 may be improved.

For convenience of explanation, the embodiment uses two channels CH1 and CH2 as an example. However, the disclosure may include at least two channels. In some embodiments, the channel selection circuit 130 may include three channels. For example, if the image source of the image is the same as the source of the link command, the processor 140 sets the active first channel as an inactive channel, sets a second channel as an active channel, and sets a third channel as an inactive channel. Thereafter, If the link command is still received and the image source remains the same as the source of the link command, the processor 140 sets the active second channel as an inactive channel, sets the third channel to an active channel, and sets the first channel as an inactive channel.

In an embodiment, the processor 140 is, for example, a central processing unit (CPU), or other programmable general-purpose or special-purpose microprocessor), digital signal processor (DSP), programmable controller, application specific integrated circuits (ASIC), programmable logic device (PLD) or other similar devices or combinations of these devices, which may load and execute computer programs.

Figure 2:
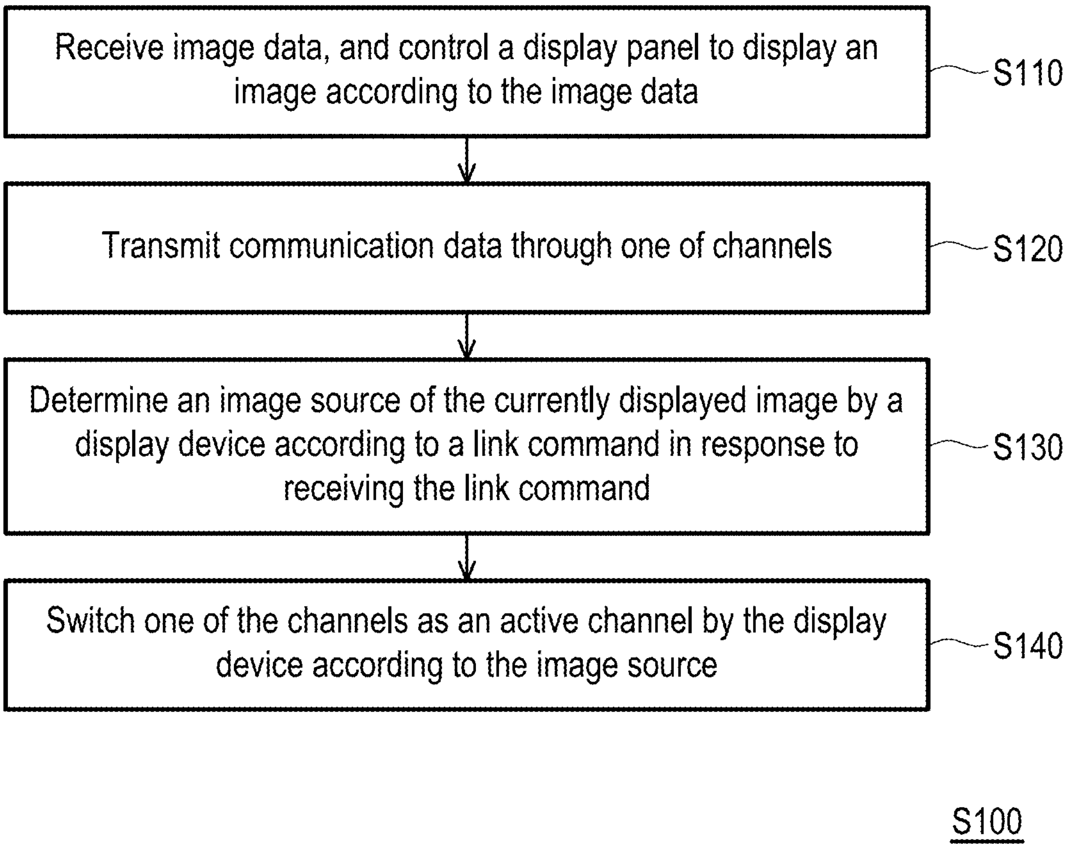
FIG. 2 is a flowchart of an operating method according to an embodiment of the disclosure.

Referring to FIG. 1 and FIG. 2, FIG. 2 is a flowchart of an operating method according to an embodiment of the disclosure. In an embodiment, the operating method S100 is adapted to the link setting between the display device 100 and the electronic device ED1 (i.e., the link setting between the hub circuit 120 and the electronic device ED1). The operating method S100 includes steps S110 to S140. In step S110, the display device 100 receives the image data IMG, and controls the display panel 110 to display an image according to the image data IMG. In step S120, the channel selection circuit 130 transmits the communication data DT1 through one of the channels CH1 and CH2.

In step S130, in response to receiving the link command CMD1, the display device 100 determines the image source of the currently displayed image according to the link command CMD1. In step S140, the display device 100 controls the channel selection circuit 130 to switch one of the channels CH1 and CH2 as the active channel according to the image source of the currently displayed image.

Figure 3:
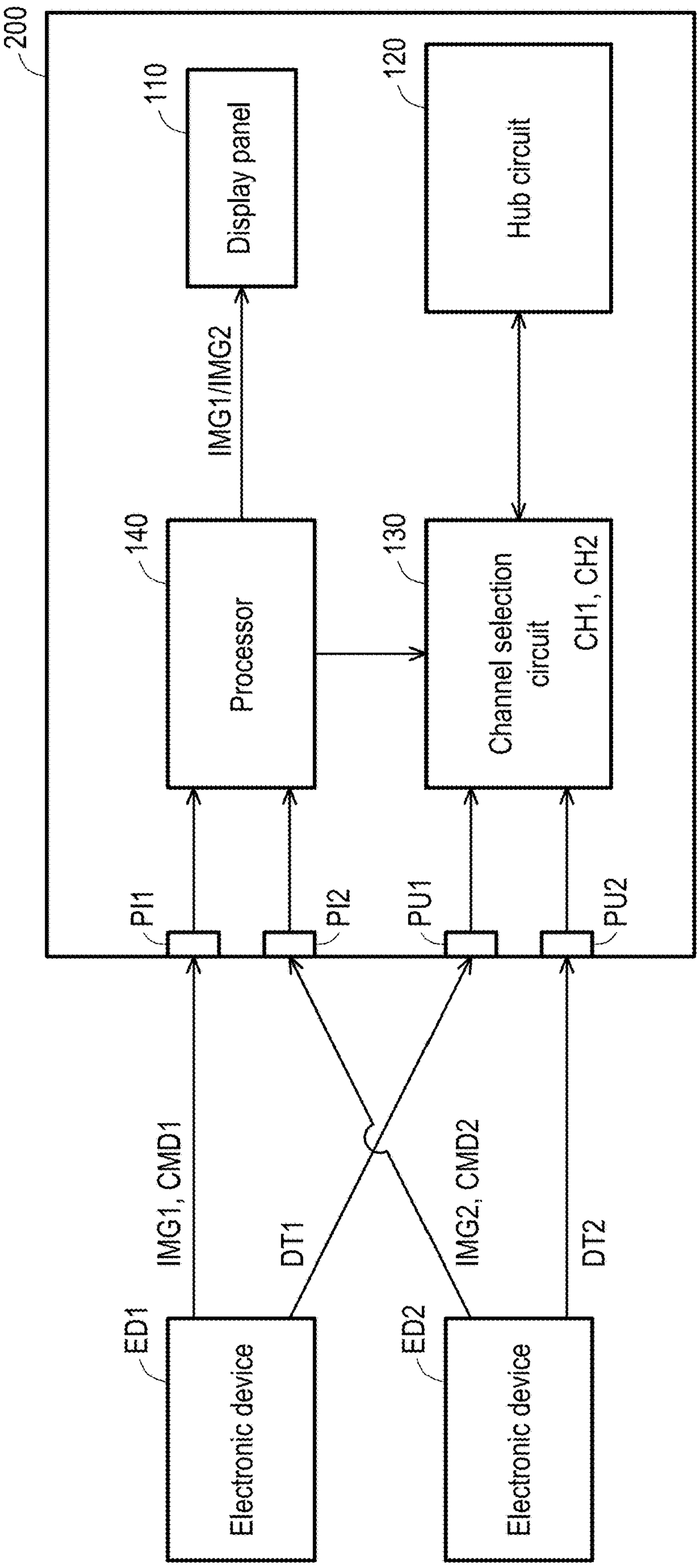
FIG. 3 is a schematic diagram of a display device and an electronic device according to an embodiment of the disclosure.

Referring to FIG. 3, FIG. 3 is a schematic diagram of a display device and an electronic device according to an embodiment of the disclosure. In an embodiment, a display device 200 includes a display panel 110, a hub circuit 120, a channel selection circuit 130, a processor 140, image ports PI1 and PI2, and uplink data ports PU1 and PU2. The processor 140 receives image data IMG1 and IMG2 through the image ports PI1 and PI2. The uplink data ports PU1 and PU2 are coupled to the channel selection circuit 130. The channel selection circuit 130 may switch one of the channels CH1 and CH2, and enable one of the channels to correspond to one of the uplink data ports PU1 and PU2 to receive communication data DT1 and DT2.

For example, the image port PI1 is connected to the electronic device ED1 to receive the image data IMG1. The image port PI2 is connected to the electronic device ED2 to receive the image data IMG2. The uplink data port PU1 is connected to the electronic device ED1 to receive the communication data DT1 of the electronic device ED1. The uplink data port PU2 of the display device 200 is connected to the electronic device ED2 to receive the communication data DT2 of the electronic device ED2.

For example, the display panel 110 currently displays an image corresponding to the image data IMG1. Therefore, the processor 140 receives the image data IMG1 through the image port PI1. However, the electronic device ED1 does not detect the hub circuit 120, which means that the active channel path is not a correct channel path. As a result, the electronic device ED1 provides the link command CMD1 to the image port PI1. Once the processor 140 receives the link command CMD1, the processor 140 determines that the image source of the currently displayed image is from the electronic device ED1. Consequently, the processor 140 controls the channel selection circuit 130 to set the inactive channel CH1 as an active channel. In other words, the channel selection circuit 130 switches the active channel, and sets the channel CH1 connected to the uplink data port PU1 as an active uplink data port. In addition, the processor 140 sets the image port PI1 to be associated with the uplink data port PU1.

For another example, the display panel 110 currently displays an image corresponding to the image data IMG2. Therefore, the processor 140 receives the image data IMG2 through the image port PI2. At the same time, the electronic device ED1 does not detect the hub circuit 120, meaning that the channel selection circuit 130 is not currently associated with the correct channel path. Therefore, the electronic device ED1 provides the link command CMD1 to the image port PI1. The processor 140 determines that the image source of the currently displayed image does not originate from the electronic device ED1. Therefore, the processor 140 associates the inactive channel CH1 with the image port PI1 that receives the link command CMD1. In other words, this indicated that the image source and channel path of the image currently displayed by the display device 200 are unrelated to the electronic device ED1. Therefore, the processor 140 sets the image port PI1 to be associated with the uplink data port PU1, and controls the display panel 110 to display another image according to the image data IMG1 from the electronic device ED1.

In an embodiment, the image ports PI1 and PI2 may be ports that respectively comply with HDMI or Display Port (DP) specifications, but the disclosure is not limited thereto.

Figure 4:
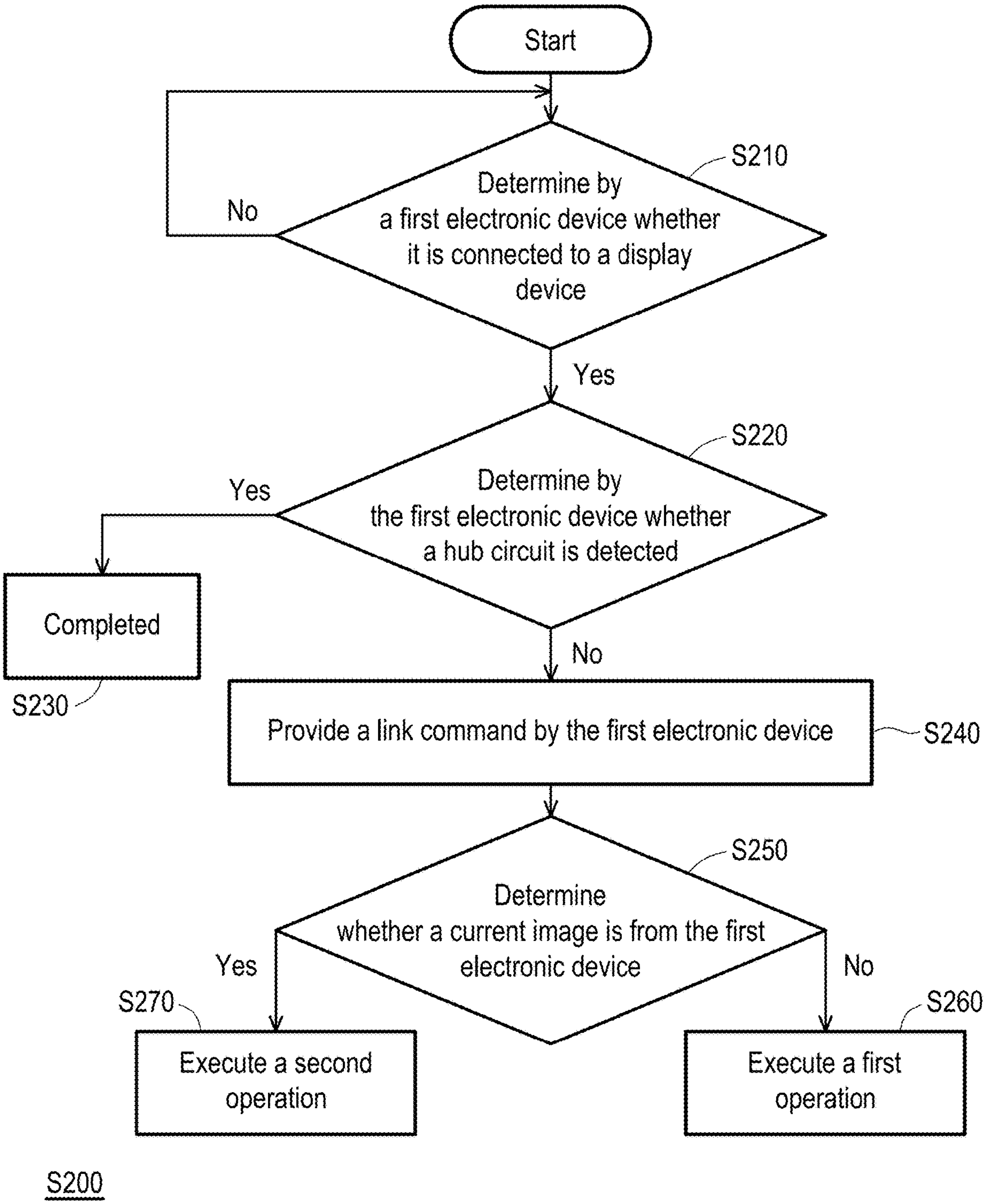
FIG. 4 is a flowchart of an operating method according to an embodiment of the disclosure.

Referring to FIG. 3 and FIG. 4, FIG. 4 is a flowchart of an operating method according to an embodiment of the disclosure. In an embodiment, an operating method S200 is adapted to link setting of the display device 200 and at least one of the electronic devices ED1 and ED2 (i.e., the link setting of the hub circuit 120 and at least one of the electronic devices ED1 and ED2). The operating method S200 includes steps S210 to S270. Taking the electronic device ED1 as a first electronic device as an example, in step S210, the electronic device ED1 determines whether it is connected to the display device 200. In response to the electronic device ED1 not being connected to the display device 200, the operating method S200 returns to the operation of step S210. In response to the electronic device ED1 being connected to the display device 200, the electronic device ED1 further determines whether the hub circuit 120 is detected in step S220. If the electronic device ED1 detects the hub circuit 120, it means that the link setting between the electronic device ED1 and the display device 200 via the channel CH1 between the uplink data port PU1 and the hub circuit 120 is successful. Therefore, in step S230 of the operating method S200, it is determined that the display device 200 completes the link setting. On the other hand, if the electronic device ED1 does not detect the hub circuit 120 through the channel CH1, which indicates that the link setting between the electronic device ED1 and the display device 200 through the channel CH1 is unsuccessful. Therefore, the electronic device ED1 provides the link command CMD1 in step S240.

In step S250, the processor 140 determines whether the currently displayed image is provided by the electronic device ED1 currently connected to the image port PI1 according to the link command CMD1. If the currently displayed image (for example, the image data IMG2) is not provided by the electronic device ED1, it means that the source of the link command CMD1 is different from the image source of the currently displayed image. Therefore, the processor 140 may execute step S260 to perform a first operation. If the currently displayed image (for example, the image data IMG1) is provided by the electronic device ED1, it means that the source of the link command CMD1 is the same as the image source of the currently displayed image. Therefore, the processor 140 may execute step S270 to perform a second operation.

Figure 5:
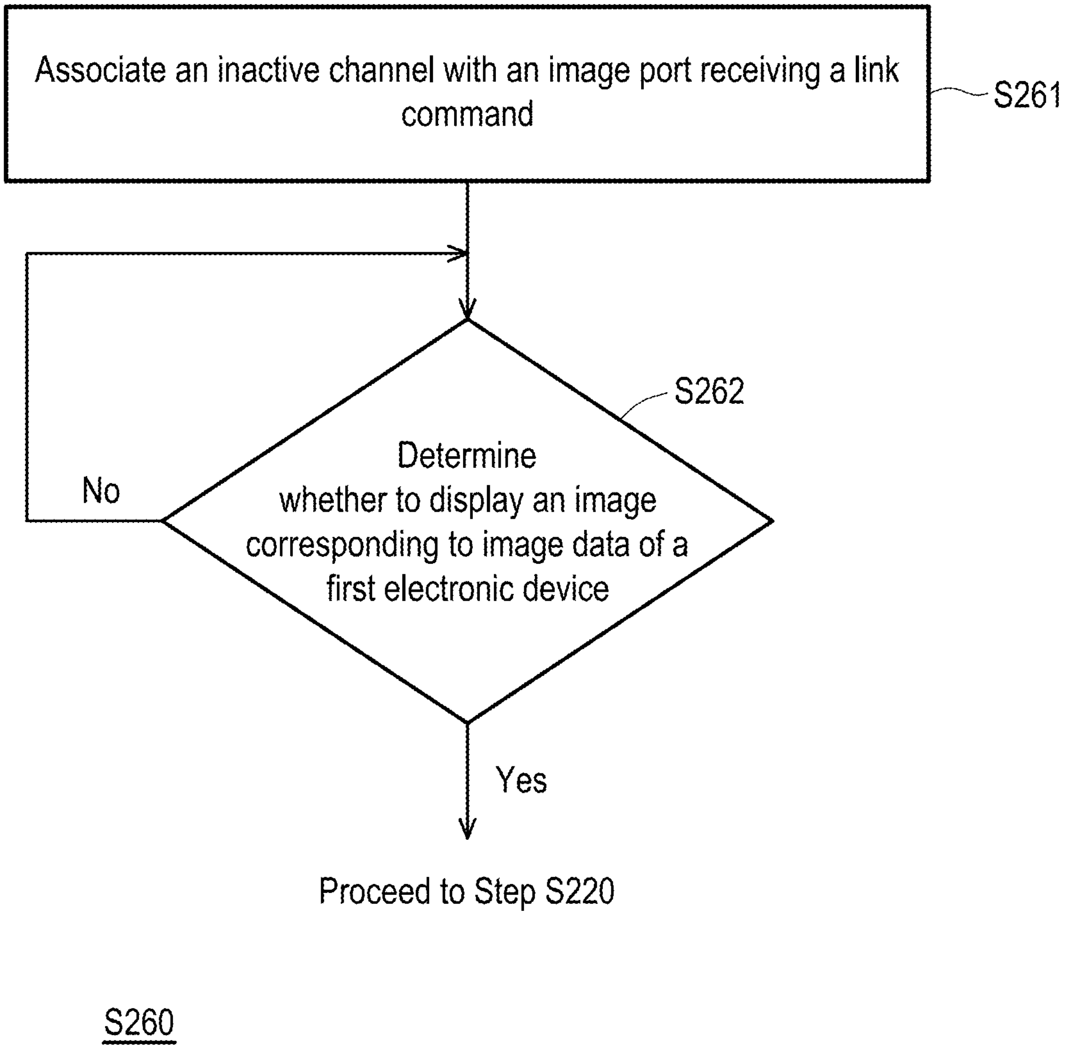
FIG. 5 is a flowchart of step S260 of FIG. 4.

Referring to FIG. 3, FIG. 4 and FIG. 5, FIG. 5 is a flowchart of step S260 of FIG. 4. In the embodiment, step S260 includes steps S261 and S262. In step S261, the processor 140 determines that the image source of the currently displayed image (for example, the image data IMG2) does not originate from the electronic device ED1. Therefore, the processor 140 associates the inactive channel CH1 with the image port PI1 that receives the link command CMD1. In step S262, the processor 140 controls the display device 200 to display another image according to another image data (for example, the image data IMG1), and determines whether to display an image corresponding to the image data IMG1 of the electronic device ED1. If the display device 200 is not operated to display the image corresponding to the image data IMG1 of the electronic device ED1, the display device 200 may return to the operation of step S262. If the display device 200 is operated to display the image corresponding to the image data IMG1 of the electronic device ED1, the display device 200 may return to the operation of step S220.

Figure 6:
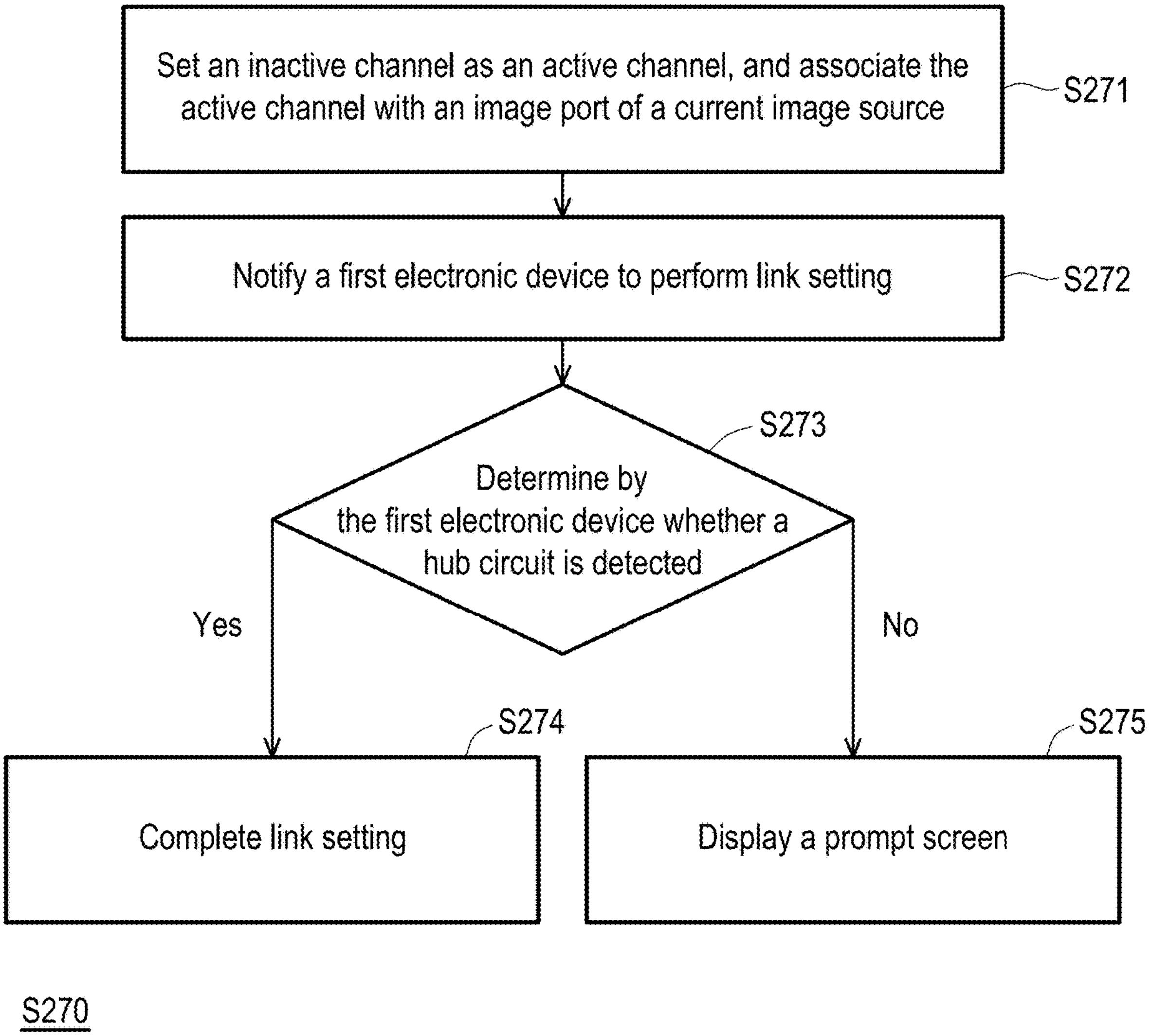
FIG. 6 is a flowchart of step S270 of FIG. 4.

Referring to FIG. 3, FIG. 4 and FIG. 6, FIG. 6 is a flowchart of step S270 of FIG. 4. In an embodiment, step S270 includes steps S271 to S275. In step S271, the processor 140 determines that the image source of the currently displayed image is from the electronic device ED1. Therefore, the processor 140 sets the inactive channel CH1 as an active channel, and associates the active channel with the image port PI1 of the current image source. By switching the active channel, the electronic device ED1 may detect the hub circuit 120. In step S272, after completing the channel switching, the display device 200 notifies the electronic device ED1 to perform link setting. In an embodiment, the display device 200 may notify the electronic device ED1 to perform the link setting through the image port PI1.

In step S273, the electronic device ED1 determines whether the hub circuit 120 is detected. If the electronic device ED1 detects the hub circuit 120 through the channel CH1, it means that the link setting of the electronic device ED1 is successful. The operating method S200 completes the link setting in step S274. On the other hand, if the electronic device ED1 still does not detect the hub circuit 120 through the channel CH1, this means that the link setting between the electronic device ED1 and the display device 200 through the channel CH1 is unsuccessful. The electronic device ED1 once again provides the link command CMD1. Furthermore, in response to still receiving the link command CMD1 from the same source after completing the switching of the channel CH1, the processor 140 determines that the electronic device ED1 communicates with the display device 200 through an incorrect or abnormal port. Therefore, the display device 200 uses the display panel 110 to display a prompt screen in step S275, thereby prompting the user that a communication data end (not shown) of the electronic device ED1 is not connected to the port.

In some embodiments, the channel selection circuit 130 may include a plurality of channels, such as three channels. It should be understood that in step S271, the processor 140 may set one of the inactive channels as an active channel, for example, by switching from the second channel to the first channel, and then execute step S272. In step S273, if the electronic device ED1 still does not detect the hub circuit 120 through the first channel, this means that the link setting between the electronic device ED1 and the display device 200 through the first channel is unsuccessful. Consequently, the electronic device ED1 once again provides the link command CMD1. At this time, the method returns to step S271 again, and the processor 140 may set one of the inactive channels as an active channel, for example, by switching from the first channel to the third channel. Furthermore, in response to still receiving the link command CMD1 from the same source after completing the switching of the last channel, the processor 140 determines that the electronic device ED1 communicates with the display device 200 through an incorrect or abnormal port. Therefore, the display device 200 uses the display panel 110 to display a prompt screen in step S275, thereby prompting the user that the communication data end (not shown) of the electronic device ED1 is not connected to the port.

It should be understood that, in an embodiment, the link setting between the electronic device ED2 and the display device 200 is similar to the link setting between the electronic device ED1 and the display device 200.

Figure 7:
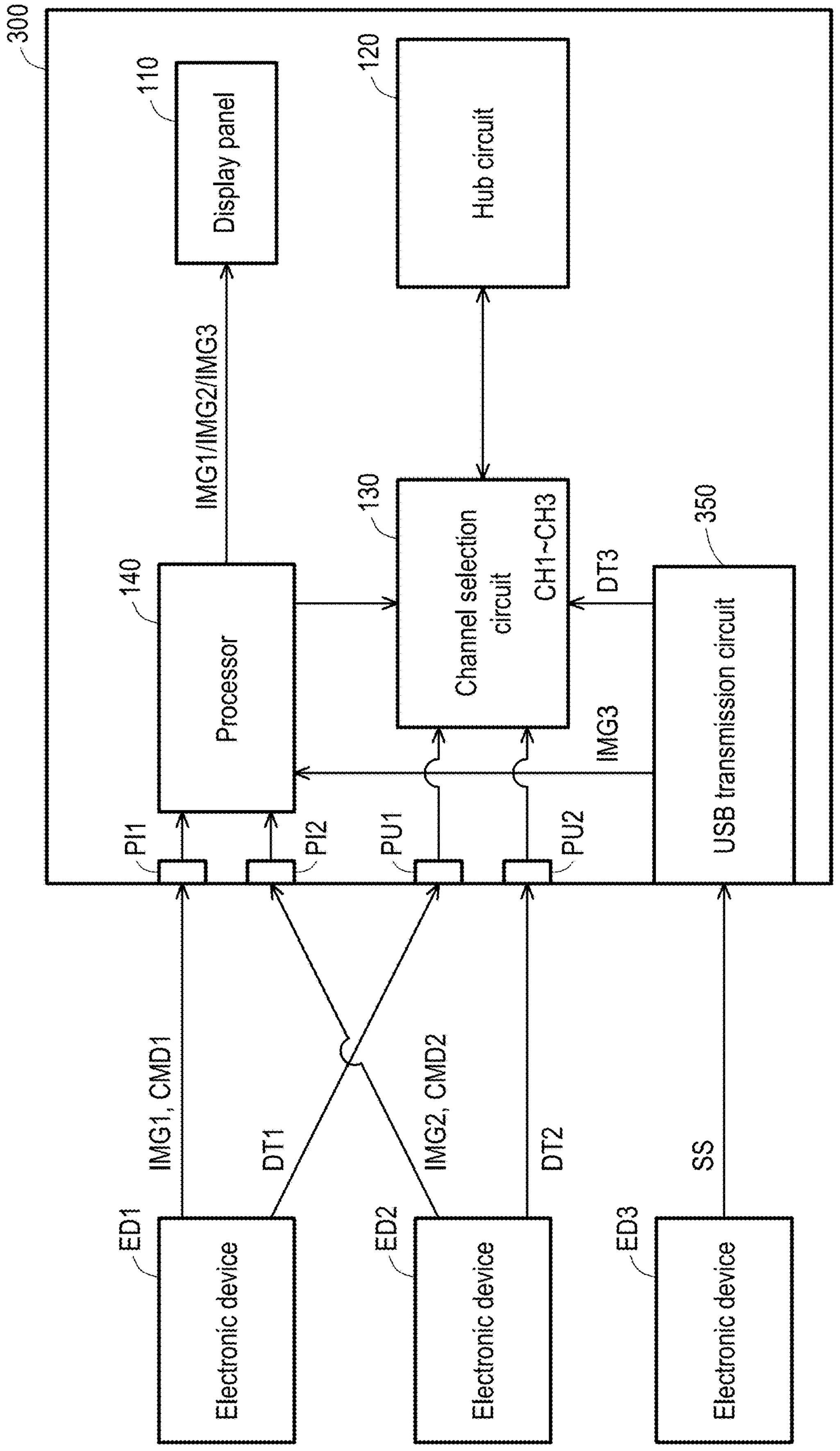
FIG. 7 is a schematic diagram of a display device and an electronic device according to an embodiment of the disclosure.

Referring to FIG. 7, FIG. 7 is a schematic diagram of a display device and an electronic device according to an embodiment of the disclosure. In an embodiment, a display device 300 includes a display panel 110, a hub circuit 120, a channel selection circuit 130, a processor 140, image ports PI1 and PI2, uplink data ports PU1 and PU2, and a USB transmission circuit 350. The implementation method that the display device 300 includes the display panel 110, the hub circuit 120, the channel selection circuit 130, the processor 140, the image ports PI1, PI2, and the uplink data ports PU1, PU2 has been described in the embodiments of FIG. 3 to FIG. 6, and details thereof are not repeated.

In an embodiment, the USB transmission circuit 350 is coupled to the processor 140 and the channel selection circuit 130. The USB transmission circuit 350 receives a signal SS and generates communication data DT3 and image data IMG3 according to the signal SS. Taking the embodiment as an example, the USB transmission circuit 350 receives the signal SS from the electronic device ED3, and generates the communication data DT3 and the image data IMG3 according to the signal SS. The USB transmission circuit 350 provides the communication data DT3 to the channel selection circuit 130 and provides the image data IMG3 to the processor 140.

Figure 8:
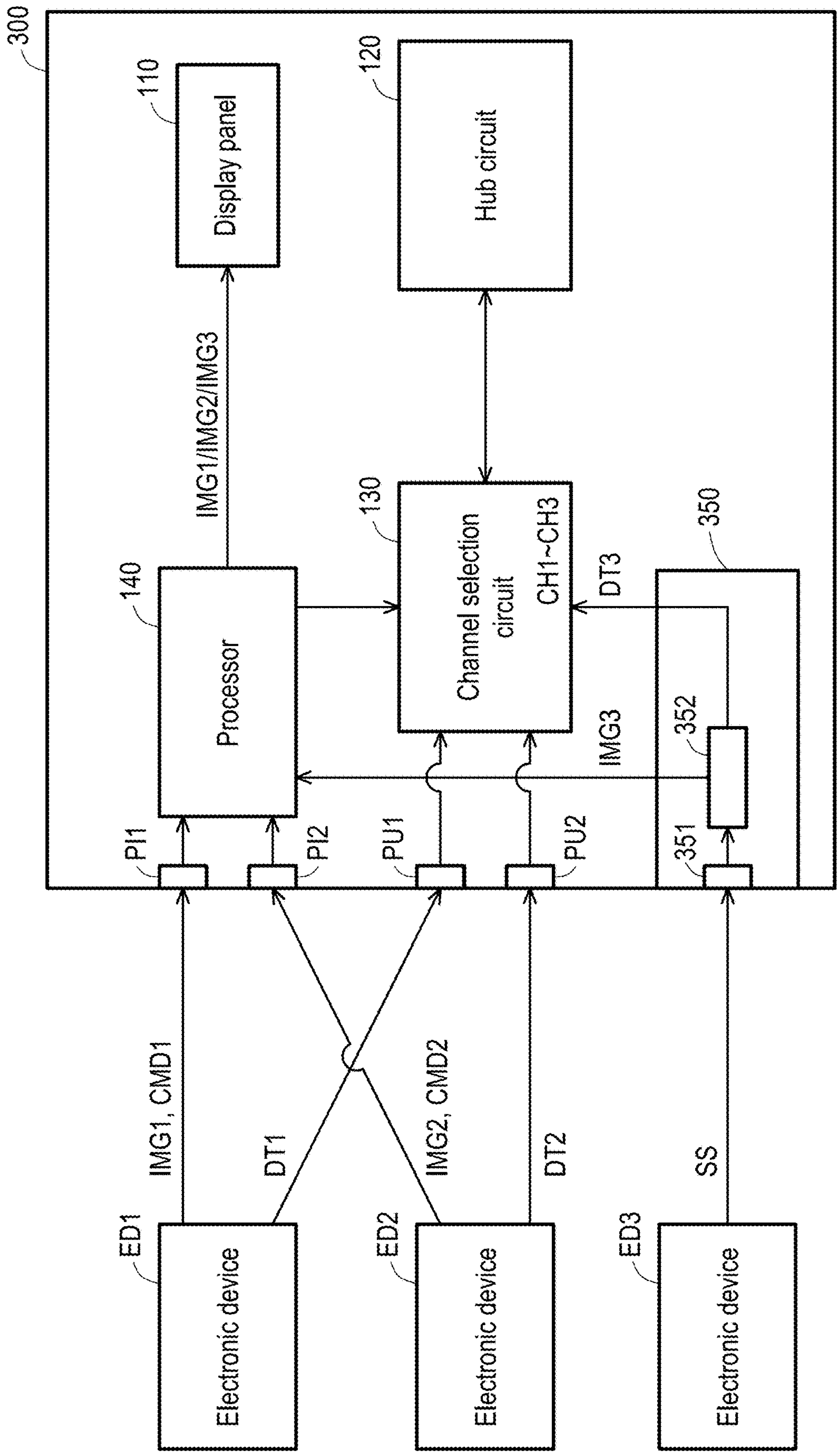
FIG. 8 is a schematic diagram of a display device and an electronic device according to an embodiment of the disclosure.

Referring to FIG. 8, FIG. 8 is a schematic diagram of a display device and an electronic device according to an embodiment of the disclosure. In an embodiment, the display device 300 includes a display panel 110, a hub circuit 120, a channel selection circuit 130, a processor 140, image ports PI1 and PI2, uplink data ports PU1 and PU2, and a USB transmission circuit 350. The implementation method that the display device 300 includes the display panel 110, the hub circuit 120, the channel selection circuit 130, the processor 140, the image ports PI1, PI2, and the uplink data ports PU1, PU2 has been described in the embodiments of FIG. 3 to FIG. 6, and details thereof are not repeated.

In an embodiment, the USB transmission circuit 350 includes a USB-C port 351 and a decoder 352. The USB-C port 351 receives the signal SS from the electronic device ED3. The decoder 352 is coupled to the USB-C port 351, the processor 140 and the channel selection circuit 130. The decoder 352 decodes the signal SS to generate communication data DT3 and image data IMG3. The decoder 352 provides the communication data DT3 to the channel selection circuit 130 and provides the image data IMG3 to the processor 140.

In an embodiment, the USB transmission circuit 350 may be implemented by a transmitter with a "Thunderbolt" transmission technology, but the disclosure is not limited thereto.

Figure 9:
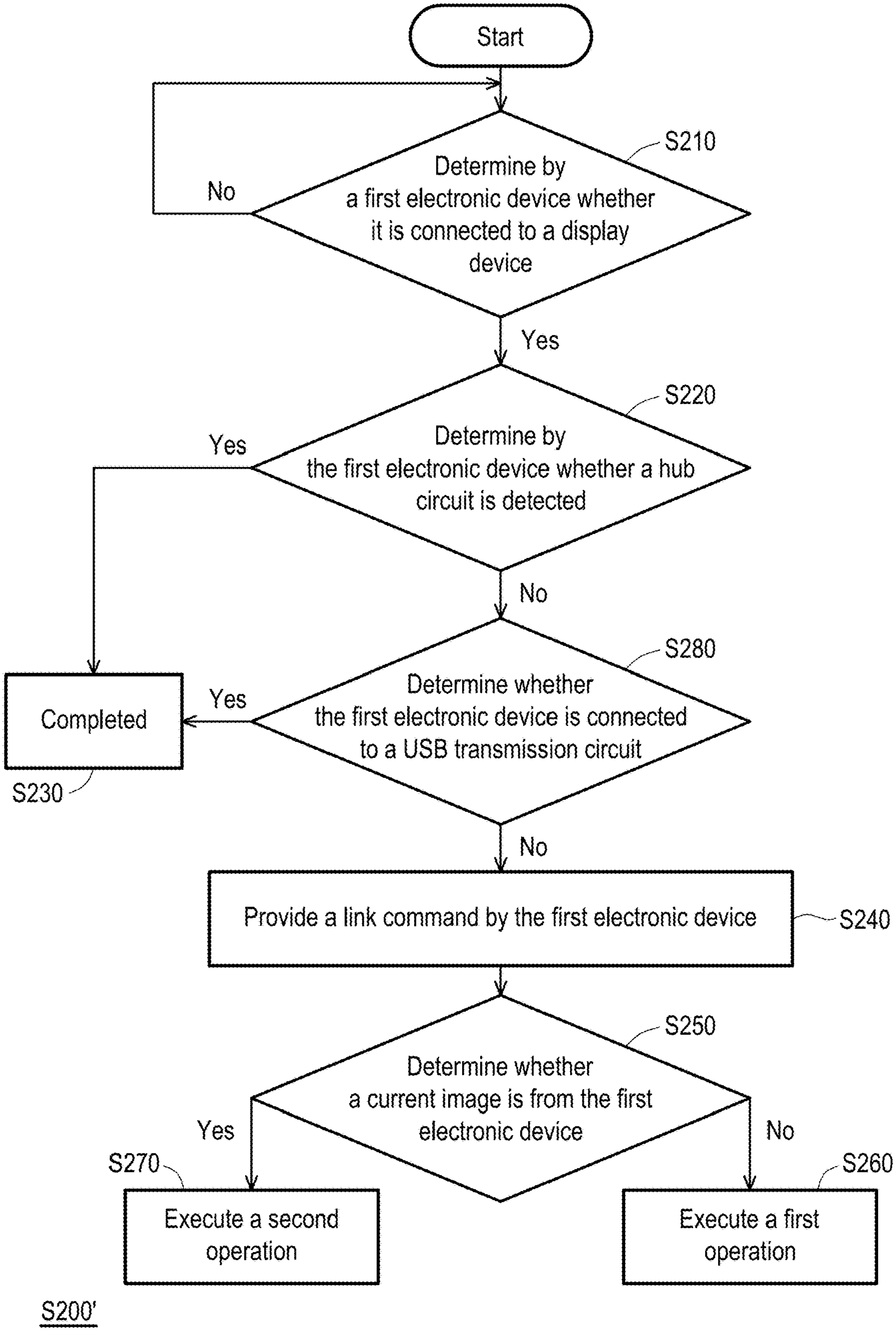
FIG. 9 is a flowchart of an operating method according to an embodiment of the disclosure.

Referring to FIG. 7 and FIG. 9, FIG. 9 is a flowchart of an operating method according to an embodiment of the disclosure. In an embodiment, an operating method S200' is applicable to the link setting of the display device 300 and at least one of the electronic devices ED1 to ED3 (i.e., the link setting of the hub circuit 120 and at least one of the electronic devices ED1 to ED). The operating method S200' includes steps S210 to S280. Different from the operating method S200, the operating method S200' adds step S280.

In an embodiment, taking the electronic device ED3 as the first electronic device as an example, in step S210, the electronic device ED3 determines whether it is connected to the display device 300. In response to the electronic device ED3 not being connected to the display device 300, the operating method S200' returns to the operation of step S210. In response to the electronic device ED3 being connected to the display device 300, the electronic device ED3 further determines whether the hub circuit 120 is detected in step S220. If the electronic device ED3 detects the hub circuit 120, it means that the link setting between the electronic device ED3 and the display device 200 is successful. Therefore, the operating method S200' completes the link setting in step S230. On the other hand, if the electronic device ED3 does not detect the hub circuit 120, the display device 300 determines whether the electronic device ED3 is connected to the USB transmission circuit 350 in step S280. As the configuration of FIG. 7, the electronic device ED3 is determined to be connected to the USB transmission circuit 350. The electronic device ED3, for example, complies with the USB-C transmission specification (but the disclosure is not limited thereto). Therefore, the display device 300 may use the processor 140 and the USB transmission circuit 350 to perform link setting with the electronic device ED3 without performing the first operation of step S260 or the second operation of step S270. The processor 140 determines that the display device 300 completes the link setting. In other words, the processor 140 determines that the connection between the electronic device ED3 and the display device 300 is correct.

Taking one of the electronic devices ED1 and ED2 as the first electronic device as an example, in step S280, as the configuration of FIG. 7, the electronic devices ED1 and ED2 are determined not to be connected to the USB transmission circuit 350. Therefore, the operating method S200' may execute the operation of step S240. In other words, in response to the image data (for example, the image data IMG1, IMG2) not originating from the USB transmission circuit 350, the display device 240 proceeds to step S240 to determine whether the current image originates from one of the electronic devices ED1, ED2 according to the link command.

Figure 10A:
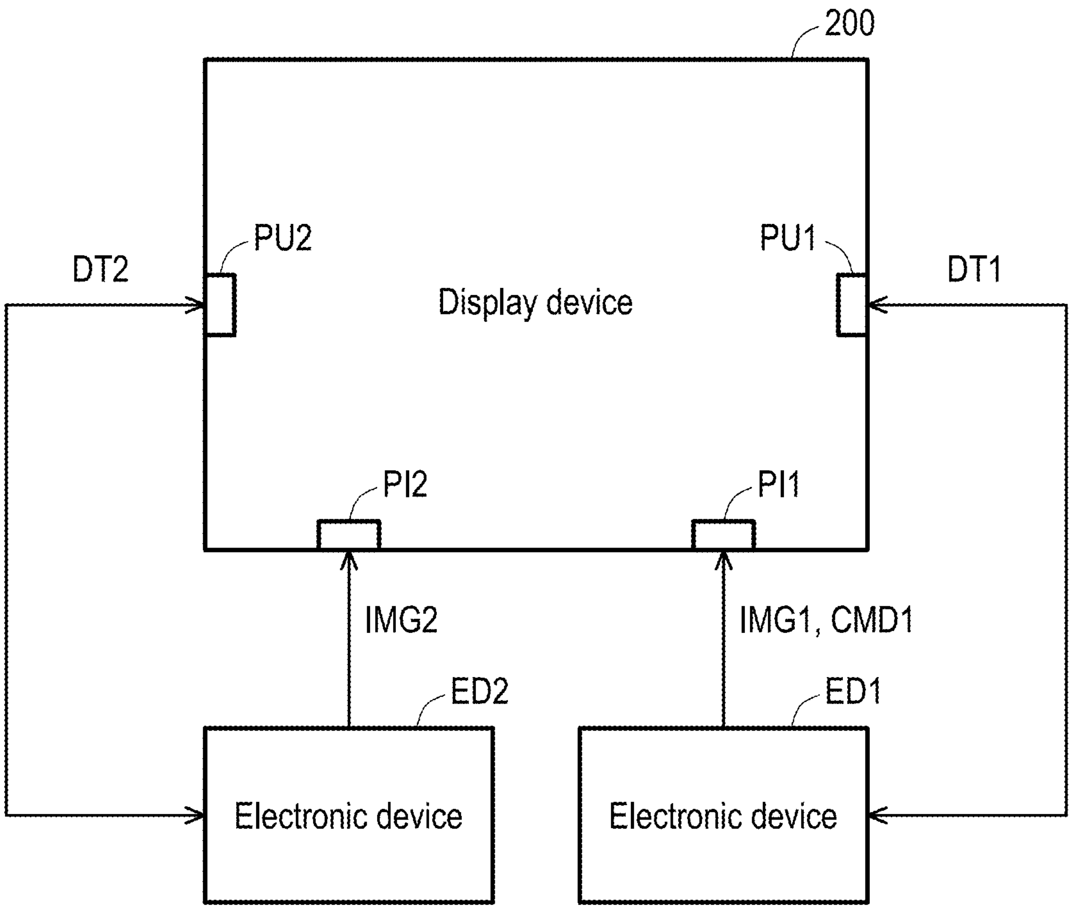
FIG. 10A to FIG. 10C are operating situation diagrams according to an embodiment of the disclosure.

Referring to FIG. 2 and FIG. 10A, FIG. 10A is an operating situation diagram according to an embodiment of the disclosure. In an embodiment, the image port PI1 of the display device 200 is connected to the electronic device ED1 to receive the image data IMG1. The image port PI2 of the display device 200 is connected to the electronic device ED2 to receive the image data IMG2. The uplink data port PU1 of the display device 200 is connected to the electronic device ED1 to receive the communication data DT1 of the electronic device ED1. The uplink data port PU2 of the display device 200 is connected to the electronic device ED2 to receive the communication data DT2 of the electronic device ED2.

For example, it is assumed that the electronic device ED1 does not detect the hub circuit 120, at this time, the display device 200 is displaying an image corresponding to the image data IMG1. This means that the uplink data port PU1 is not active (for example, the channel CH2 is the active channel, and the channel CH1 is the inactive channel). Then, description will be made from the perspectives of the electronic device ED1 and the electronic device ED2 respectively.

From the perspective of the electronic device ED1, the electronic device ED1 provides the link command CMD1 to the display device 200. The display device 200 determines that the image source of the currently displayed image is the electronic device ED1 according to the link command CMD1, and controls the channel selection circuit 130 to switch channels and set the inactive channel (for example, the channel CH1) as an active channel, i.e., the channel (for example, the channel CH1) between the uplink data port PU1 and the hub circuit 120 is set as the active channel. At this time, the display device 200 sets the uplink data port PU1 to be associated with the image port PI1. Then, the display device 200 notifies the electronic device ED1 to perform the link setting. If the electronic device ED1 detects the hub circuit 120 this time, it means that the link setting of the electronic device ED1 is successful. If the electronic device ED1 still does not detect the hub circuit 120 this time, it means that the link setting of the electronic device ED1 is unsuccessful. At this time, the display device 200 uses the display panel 110 to display a prompt screen, thereby prompting the user that the communication data end (not shown) of the electronic device ED1 is not connected to the port.

In addition, from the perspective of the electronic device ED2, the electronic device ED2 may detect the hub circuit 120. Therefore, the link setting of the electronic device ED2 is successful. However, at this time, the display device 200 is displaying the image corresponding to the image data IMG1. Therefore, the display device 200 does not display the image corresponding to the image data IMG2. Although the link setting of the electronic device ED2 is successful, since the display device 200 currently displays the image corresponding to the image data IMG1, in order to avoid operation conflicts between the electronic device ED1 and the electronic device ED2, the electronic device ED2 temporarily does not perform any operation.

Figure 10B:
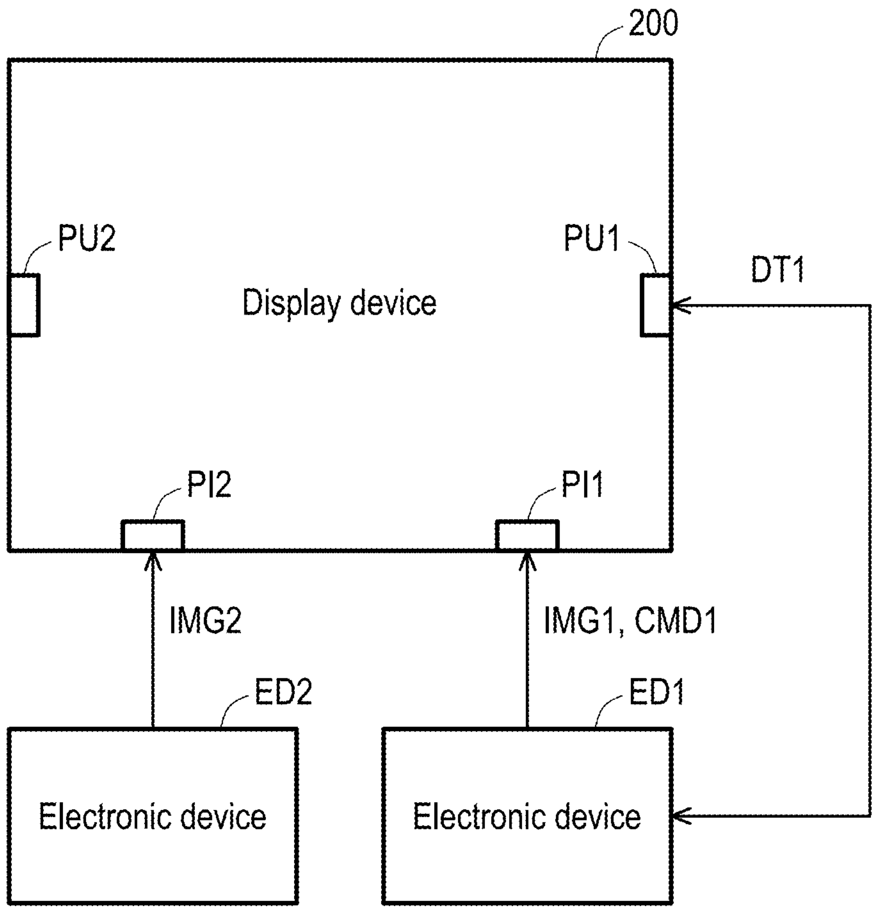

Referring to FIG. 2, FIG. 10A and FIG. 10B, FIG. 10B is an operating situation diagram according to an embodiment of the disclosure. In an embodiment, a main difference between FIG. 10B and FIG. 10A is that the uplink data port PU2 of the display device 200 is not connected to the electronic device ED2, and other configuration relationships have been clearly explained in the embodiment of FIG. 10A, which will not be repeated.

The display device 200 and the electronic device ED1 may perform link setting according to the embodiment of FIG. 10A, which will not be repeated here.

In addition, from the perspective of the electronic device ED2, the electronic device ED2 cannot detect the hub circuit 120, which means that the uplink data port PU2 is not active (where, the channel CH2 is the active channel, and the channel CH1 is the inactive channel). Therefore, the electronic device ED2 provides the link command CMD2 to the display device 200. The display device 200 determines that the image source of the currently displayed image is not the electronic device ED2 according to the link command CMD2 of the electronic device ED2. Therefore, the display device 200 sets the inactive channel (for example, the channel CH1) to be associated with the image port PI2 that receives the link command CMD2. Then, the display device 200 notifies the electronic device ED2 to perform the link setting. However, the electronic device ED2 still cannot detect the hub circuit 120 via the uplink data port PU2 (since the uplink data port PU2 does not use the channel CH1). Therefore, the display device 200 uses the display panel 110 to display a prompt screen, thereby prompting the user that the communication data end (not shown) of the electronic device ED2 is not connected to the port.

Figure 10C:
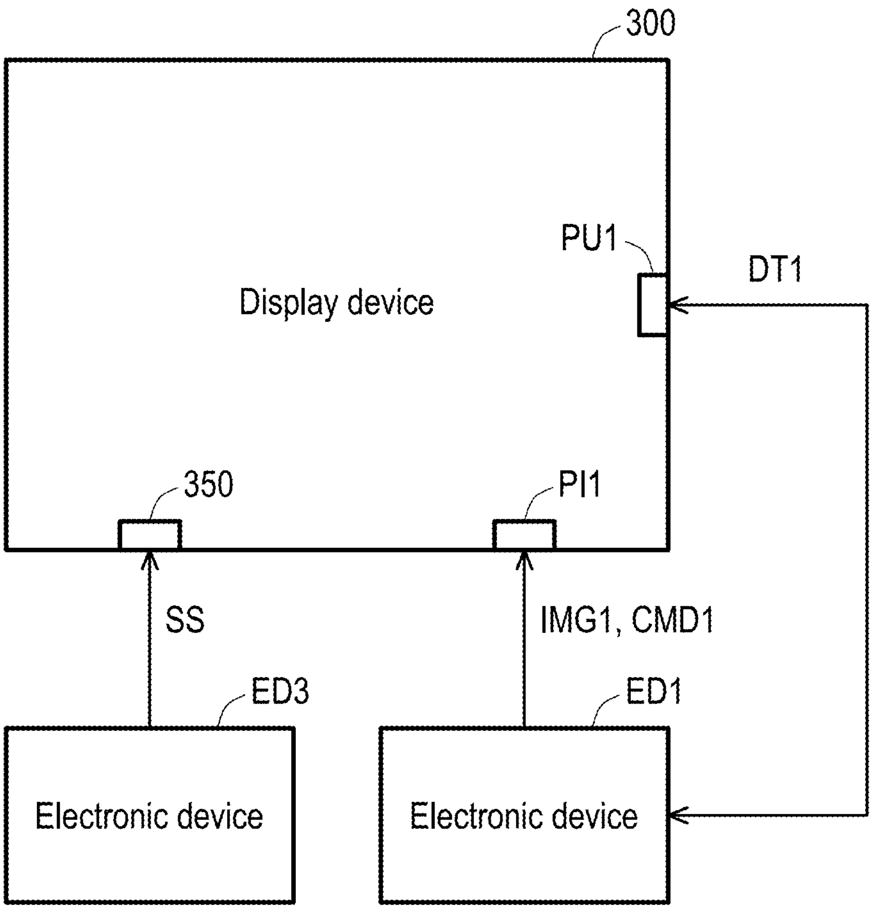

Referring to FIG. 3 and FIG. 10C, FIG. 10C is an operating situation diagram according to an embodiment of the disclosure. In an embodiment, the image port PI1 of the display device 300 is connected to the electronic device ED1 to receive the image data IMG1. The uplink data port PU1 of the display device 300 is connected to the electronic device ED1 to receive the communication data DT1 of the electronic device ED1. It should be noted that the USB transmission circuit 350 of the display device 300 is connected to the electronic device ED3 to receive the signal SS of the electronic device ED1.

The display device 300 and the electronic device ED1 may perform link setting according to the embodiments of FIG. 10A and FIG. 10B. The display device 300 and the electronic device ED3 may perform link setting according to the embodiments of FIG. 7 and FIG. 9.

In summary, the display device automatically performs link setting with at least one electronic device according to the received image data and the link command. Therefore, the user does not need to perform manual settings through the settings of the display device. In this way, the usage convenience of the display device may be improved.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A display device, comprising:

a display panel;

a hub circuit;

a channel selection circuit coupled to the hub circuit, and configured to transmit communication data through one of a plurality of channels; and a processor coupled to the channel selection circuit and the display panel, and configured to:

receive image data, and control the display panel to display an image according to the image data;

determine an image source of the image data according to the link command in response to receiving a link command, wherein the link command is a communication signal that an electronic device does not detect the hub circuit;

determine a result of whether the image source originates from the electronic device that provides the link command; and switch one of the channels to be an active channel according to the result.

2. The display device as claimed in claim 1, wherein in response to the image source being different from a source of the link command, the processor controls the channel selection circuit to associate an inactive channel from among the current channels with an image port receiving the link command.

3. The display device as claimed in claim 2, wherein in response to the processor controlling the channel selection circuit to associate the inactive channel from among the current channels with the image port receiving the link command, the processor controls the display panel to display another image according to another image data, wherein the another image data originates from the source of the link command.

4. The display device as claimed in claim 1, wherein in response to the image source being the same as a source of the link command, the processor controls the channel selection circuit to set an inactive channel from among the current channels as the active channel, and associate the active channel with an image port of the image source.

5. The display device as claimed in claim 4, wherein in response to the image source being the same as the source of the link command and receiving the same link command again, the processor controls the display panel to display a prompt screen.

6. The display device as claimed in claim 1, further comprising:

at least one image port, wherein the processor receives the image data through the at least one image port.

7. The display device as claimed in claim 6, further comprising:

a plurality of uplink data ports coupled to the channel selection circuit, wherein the channel selection circuit receives one of at least one communication data through one of the uplink data ports.

8. The display device as claimed in claim 6, further comprising:

a USB transmission circuit coupled to the processor and the channel selection circuit, configured to receive a signal, and generating the communication data and the image data according to the signal.

9. The display device as claimed in claim 8, wherein in response to the communication data and the image data originating from the USB transmission circuit, the processor determines that the display device completes link setting.

10. The display device as claimed in claim 8, wherein in response to the image data not originating from the USB transmission circuit, the processor determines whether a source of the image is the same as a source of the link command according to the link command.

11. An operating method adapted to a display device, wherein the display device comprises a processor, a display panel, and a channel selection circuit, and the operating method comprises:

receiving, by the processor, image data, and controlling the display panel to display an image according to the image data;

transmitting, by the channel selection circuit, communication data through one of a plurality of channels;

in response to a link command, determining, by the processor, an image source of the currently displayed image according to the link command, wherein the link command is a communication signal that an electronic device does not detect the hub circuit;

determining a result of whether the image source originates from the electronic device that provides the link command; and switching, by the processor according to the result, one of the channels to be an active channel.

12. The operating method as claimed in claim 11, wherein determining the image source of the currently displayed image according to the link command comprises:

in response to the image source being different from a source of the link command, associating an inactive channel from among the current channels with an image port receiving the link command.

13. The operating method as claimed in claim 12, further comprising:

controlling the display panel to display another image according to another image data, wherein the another image data originates from the source of the link command.

14. The operating method as claimed in claim 11, wherein determining the image source of the currently displayed image according to the link command comprises:

in response to the source of the image being the same as a source of the link command, setting an inactive channel from among the channels as the active channel, and associating the active channel with an image port of the image source.

15. The operating method as claimed in claim 14, further comprising:

in response to the image source being the same as the source of the link command and receiving the same link command again, controlling the display panel to display a prompt screen.

16. The operating method as claimed in claim 11, wherein the display device further comprises at least one image port, and the processor receives the image data through the at least one image port.

17. The operating method as claimed in claim 16, wherein the display device further comprises a plurality of uplink data ports, and the channel selection circuit receives at least one communication data through one of the uplink data ports.

18. The operating method as claimed in claim 16, wherein the display device further comprises a USB transmission circuit, and the operating method further comprises:

receiving a signal by the USB transmission circuit, and generating the communication data and the image data according to the signal.

19. The operating method as claimed in claim 18, further comprising:

in response to the communication data and the image data originating from the USB transmission circuit, determining, by the processor, that the display device completes link setting.

20. The operating method as claimed in claim 18, further comprising:

in response to the image data not originating from the USB transmission circuit, determining, by the processor, whether the image source is the same as a source of the link command according to the link command.

* * * * *